Patented Oct. 30, 1928.

1,689,545

UNITED STATES PATENT OFFICE.

KENNETH M. BAUM, OF SAN FRANCISCO, CALIFORNIA.

PROCESS OF SEPARATING SULPHUR FROM OTHER MATERIALS.

No Drawing.    Application filed September 3, 1927.   Serial No. 217,530.

This invention relates generally to a process of separating elemental sulphur from its ores, concentrates of its ores or from other materials in which it is present.

In various localities deposits of sulphur ore occur where the winning of the sulphur cannot be accomplished by the Frasch process, and many methods have been proposed and tried to work these deposits. In general these methods have not in recent years been very successful, due mainly to either the relatively low sulphur recovery or to the mechanical difficulties encountered.

It is the object of this invention to devise a cheap and effective process of obtaining relatively pure sulphur from its ores or from other materials containing it.

In my process the sulphur bearing material is crushed to a suitable size and heated above the melting point of sulphur by immersion into a solution of zinc chloride ($ZnCl_2$) of specific gravity greater than 1.81 at 114 degrees centigrade. Under these conditions, the sulphur is melted, and being lighter than the zinc chloride solution, floats as a melt upon the solution, whereas the impurities being mainly heavier than the zinc chloride solution go to the bottom of the container. It has been found that there is not sufficient chemical action between the sulphur and the zinc chloride solution to vitally affect the process. The boiling point of the zinc chloride solution is well above such temperatures as may be required. A separation of practically all of the sulphur from the gangue is effected, due to the preferential tendency of the gangue to be wetted by aqueous solutions rather than by molten sulphur. After the sulphur is melted it is run off from the container and cast in moulds or otherwise treated. The gangue is also removed and treated for recovery of the adhering zinc chloride solution. The main body of the zinc chloride solution is used over and over until contaminated to such an extent that it requires purification, when this is done and it is returned to the process.

This process may be made continuous and in practice may be carried out as follows:

The ore is crushed to approximately one inch size and screened if necessary to remove fines, which may be treated separately. This one inch ore is fed together with relatively hot zinc chloride solution into a rotary steam jacketed horizontal cylinder, wherein the mixture is heated above the melting point of sulphur. There are a number of these cylinders, preferably three or more in order that there may be a continuous discharge of the mixture into the next stage of the process. From the rotary cylinder the mixture is fed into a separator, so constructed that the molten sulphur can be continuously tapped off from the surface of the mixture and the gangue can be continuously removed from the bottom of the separator. The tapped off sulphur may be cast in molds and sold or may be subjected to further treatment. The removed gangue is washed by counter current decantation or filtered on a continuous filter and washed thereon. The washing medium is water, dilute hydrochloric acid or other suitable material. The washed gangue is discarded in any suitable manner. The wash waters are evaporated in any suitable evaporator, the evolved steam being used for heating purposes and the evaporated zinc chloride returned to the process.

I claim:

1. In a process of separating elemental sulphur from other materials, the steps of heating material containing elemental sulphur together with an aqueous solution of zinc chloride of a strength such that the specific gravity of this solution is greater than the specific gravity of molten sulphur when at the same temperature and less than the specific gravity of the main portion of the extraneous matter other than sulphur present, to a temperature above the melting point of sulphur, and removing the floating molten sulphur substantially free from other materials.

2. In a process of separating elemental sulphur from other materials, the steps of heating material containing elemental sulphur together with an aqueous solution of metallic salts of a strength such that the specific gravity of this solution is greater than the specific gravity of molten sulphur when at the same temperature and less than the specific gravity of the main portion of the extraneous matter other than sulphur present, to a temperature above the melting point of sulphur, and removing the floating molten sulphur substantially free from other materials.

3. In process of separating elemental sulphur from other materials, the steps of heating material containing elemental sulphur together with an aqueous solution of metallic salts of a strength such that the specific gravity of this solution is greater than the specific gravity of molten sulphur when at the same temperature and less than the specific gravity of the main portion of the extraneous matter other than sulphur present, to a temperature above the melting point of sulphur, cooling the mixture until the sulphur solidifies, and removing the solidified sulphur.

KENNETH M. BAUM.